United States Patent
Yanagita

(10) Patent No.: US 6,728,013 B1
(45) Date of Patent: Apr. 27, 2004

(54) PRINTING APPARATUS AND COLOR IMAGE PRINTING METHOD

(75) Inventor: Hiromi Yanagita, Tokyo (JP)

(73) Assignee: NEC Corporation, Tokyo (JP)

( * ) Notice: Subject to any disclaimer, the term of this patent is extended or adjusted under 35 U.S.C. 154(b) by 863 days.

(21) Appl. No.: 09/589,085

(22) Filed: Jun. 8, 2000

(30) Foreign Application Priority Data

Jun. 10, 1999 (JP) .......................... 11-164331

(51) Int. Cl.[7] .................... G06F 3/12; G06K 15/02
(52) U.S. Cl. ................ 358/515; 358/1.1; 347/19; 347/43; 347/57; 347/58; 347/59; 347/237; 382/162
(58) Field of Search .................... 358/515; 347/237, 347/19, 43, 57, 58, 59; 382/162

(56) References Cited

U.S. PATENT DOCUMENTS 5,136,664 A * 8/1992 Bersack et al. ............. 382/304
5,790,765 A * 8/1998 Kobayashi .................. 358/1.9
6,449,664 B1 * 9/2002 Honary et al. ................ 710/22
6,486,972 B1 * 11/2002 Hasegawa ................... 358/1.9

FOREIGN PATENT DOCUMENTS

| JP | 8-192542 | 7/1996 |
| JP | 10-240478 | 9/1998 |
| JP | 11-188927 | 7/1999 |

* cited by examiner

Primary Examiner—Edward Coles
Assistant Examiner—Alan Rahimi
(74) Attorney, Agent, or Firm—Foley & Lardner

(57) ABSTRACT

A printing apparatus comprises CPUs provided for corresponding one of a plurality of colors, each of which generates image data of a specified color; memories, each of which stores the image data of the specified color; system ASICs, each of which manages the memories; video output controllers, each outputting the image data supplied from the corresponding system ASICs as a video signal; and image generating sections, each generating an image based on the video signal outputted from the video output controllers.

6 Claims, 3 Drawing Sheets

PRINTING APPARATUS AND COLOR IMAGE PRINTING METHOD

BACKGROUND OF THE INVENTION

1. Field of the Invention

The present invention relates to a printing apparatus and a color image printing method, more particularly to a printing apparatus which has a function to perform a high speed color printing and a color image printing method.

2. Descriptions of the Related Arts

There have been heretofore color printers having a function to perform a color printing in a plurality of colors. In conventional color printers, one microprocessor performs conversions to data structures for use in the printers with respect to all colors including cyan, magenta, yellow and black, and controls preparations of image data.

As prior arts concerning the above-described color printers, a technology disclosed in Japanese Patent Laid-Open No. 8(1996)-19542 was proposed. The technology disclosed in this gazette intends a high speed typing, and discloses an image output apparatus which comprises transporting means for transporting paper; a plurality of image output section arranged along the transporting path for the paper transported by the transporting means, each of which outputs an image to the paper simultaneously with others; a plurality of storage means, each of which is provided so as to correspond to corresponding one of the image output section; first transfer means for sequentially transferring data collected in a predetermined block unit to the storage means; and second transfer means for sequentially transferring the data transferred to each storage means by the first transfer means to the corresponding image output means.

However, there has been the following problem in the above described prior art.

Since one microprocessor controls the generation of the image data with respect to all colors including cyan, magenta, yellow and black in the above described conventional color printers, performance of one microprocessor determines an upper limit of throughput of the printer, and hence it is difficult to realize a high speed color laser printer. Moreover, also in the prior art disclosed in the gazette, a central processing unit for controlling the printing processing collectively is one, so that the prior art has a problem in terms of high speed processing similarly to the conventional color printer.

SUMMARY OF THE INVENTION

The object of the present invention is to provide a printing apparatus which enables a high speed color printing by controlling image generation by use of micro processors provided individually for colors of cyan, magenta, yellow and black. The object of the present invention is also to provide a color image printing method.

A printing apparatus of the present invention, which forms a color image on a printing medium, comprises a plurality of main control means provided for corresponding colors, each of which generates image data for corresponding one of the colors; a plurality of storage means provided for the corresponding main control means, each of which stores the image data for corresponding one of the colors; a plurality of storage control means provided for the corresponding storage means, each of which controls writing/reading of the image data for corresponding one of the storage means; a plurality of video output control means provided for the corresponding storage control means, each of which outputs the image data as a video signal, the image data being supplied from the corresponding storage control means; and a plurality of image generating means provided for the corresponding video output control means, each of which generates an image based on the video signal output from the corresponding video output control means.

The printing apparatus of the present invention generates image data for each of the colors by corresponding one of the plurality of main control means provided for the corresponding colors. Next, each of the image data for the corresponding colors is stored by the plurality of storage control means provided for the corresponding main control means. Subsequently, the image data stored in each storage means is output as the video signal by each of the video output control means provided for corresponding one of the storage control means. Thereafter, each of the image generating means provided for corresponding one of the video output control means generates an image based on the video signal.

Generally, in the printing by the color laser, since a very large quantity of data needs to be processed, CPU has to show a data processing capability quadruple to 32 times as that of monochromatic laser printing. However, it is difficult to obtain inexpensive CPU which satisfies such requirement concerning the data processing capability. Accordingly, in the present invention, by using four inexpensive CPUs on the market for the four colors, high speed generation of color image data is enabled, and hence a high speed color laser printer can be provided.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

An embodiment of the present invention will be described with reference to the accompanying drawings below.

(1) Descriptions for a Constitution

The embodiment of the present invention relates to a constitution of a controller of a color laser printer. Particularly, the present invention relates to a constitution of a controller for use in a tandem printer engine in which an image generating section is independently provided for colors including cyan, magenta, yellow and black.

Figure 1:
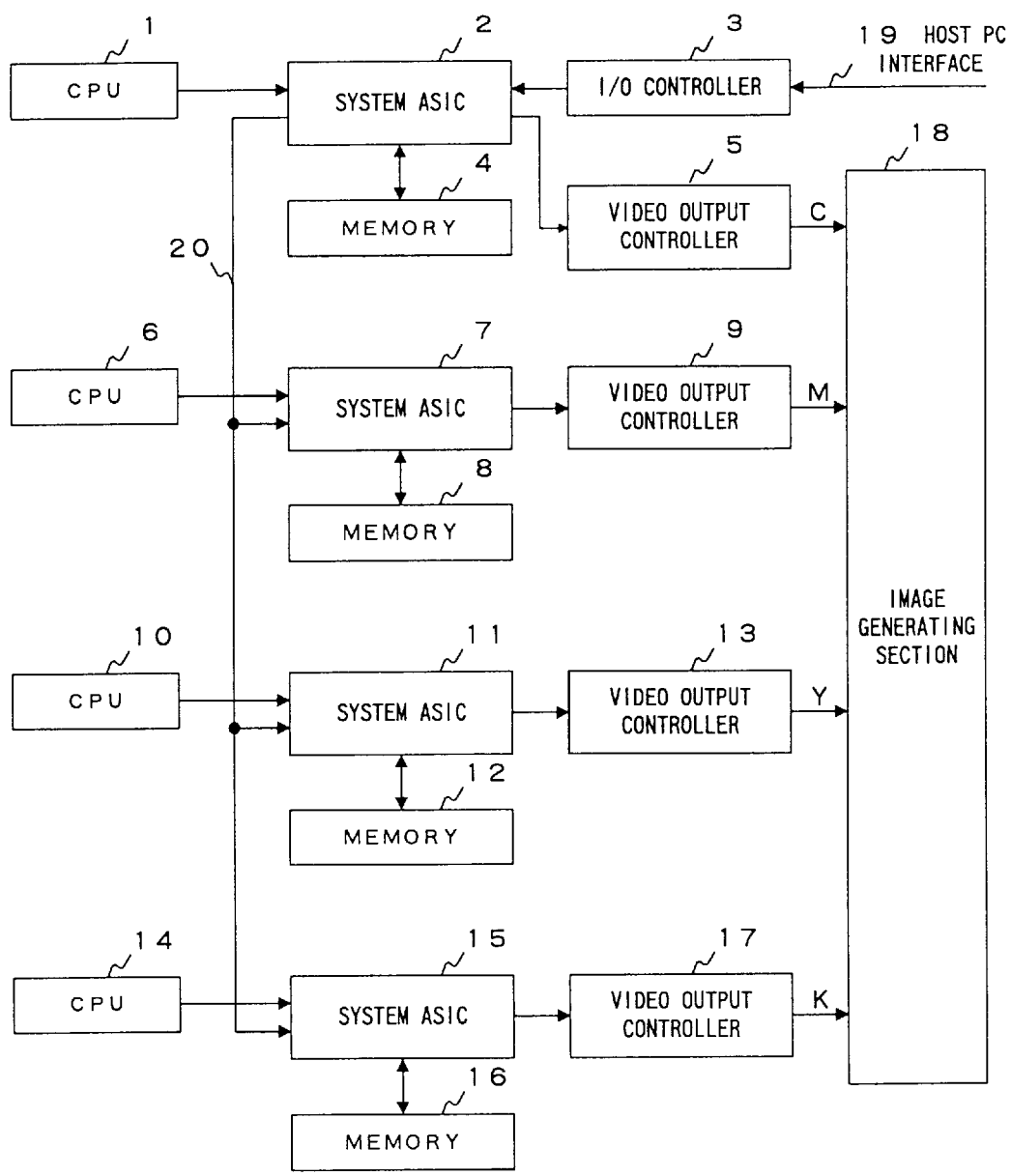
FIG. 1 is a block diagram showing a constitution of an image generation control system of a color laser printer according to an embodiment of the present invention.

FIG. 1 is a block diagram showing a constitution of an image generating control system of a color laser printer according to an embodiment of the present invention. Referring to FIG. 1, the image generating control system of the color laser printer according to the embodiment of the present invention comprises CPUs 1, 6, 10 and 14 provided for the corresponding colors including cyan, magenta, yellow and black; system ASICs 2, 7, 11 and 15 provided for the corresponding colors, which are ICs for special use; memories 4, 8, 12 and 16 provided for the corresponding colors; an I/O controller 3; and an image generating section 18. In FIG. 1, reference numeral 19 denotes a host PC interface, and reference numeral 20 denotes a common bus. Note that in this embodiment, memories for storing code data to be output to the image generating section 18 are provided independently for the corresponding CPUs 1, 6, 10 and 14. The image generating section 18 is a printer engine, which irradiates a laser beam of each color collectively on a photosensitive body, thus printing a desired image and text on transferred paper. The CPU 1 is constituted as a microprocessor which controls the whole system and manages a generation of image data of a specified color (cyan in this embodiment). Similarly, the CPUs 6, 10 and 14 are constituted as a microprocessor for managing a generation of each image data of specified colors (magenta, yellow and black in this embodiment). The system ASIC 2 for special use is connected to the CPU 1, and manages the memory 4. Moreover, the system ASIC 2 controls a transfer of data transmitted from a host PC (not shown) via the host PC interface 19 and the I/O controller 3. The system ASICs 7, 11 and 15 are connected to the CPUs 6, 10 and 14 respectively, and manage the memories 8, 12 and 16 respectively. The CPUs 1, 6, 10 and 14 have separate memory spaces corresponding to the contents stored in the memories 4, 8, 12 and 16, which are connected to the CPU via the corresponding system ASICs 2, 7, 11 and 15. The CPUs 1, 6, 10 and 14 manages the corresponding memories 4, 8, 12 and 16 by referring to their memory spaces.

The I/O controller 3 is a function block which controls received data from the host PC (not shown) and controls I/O such as an operator panel equipped in the color laser printer.

The CPU 1 separates the received data from the host PC for each color. The data transmitted from the host PC is mainly RGB data, and is bit map data or a character, a line drawing and graphic data with color information. The bit map data includes resolution information and values of RGB data of each pixel. The character, the line drawing and the graphic data includes color information formed of tile patterns of 8×8 dots concerning the values of RGB, and information relating to forms of the character, the line drawing and the graphic data. The CPU 1 discriminates the contents of the RGB data received from the host PC one by one, and allows each of four separate storing areas in the memories 4 to store the contents therein by performing a color conversion if necessity arises. The CPU 1 transmits data other than data concerning a first color (cyan) among the data stored in each area to the CPUs 6, 10 and 14 via separate buses. The transmitted data is stored in the memories 8, 12 and 16 corresponding to the respective CPUs.

The CPU 1 manages the generation of the image data concerning the first color (cyan) as described above. The system ASIC 2 manages the memory 4 for the first color, and the video output controller 5 is a function block for outputting the concerned image data to the image generating section 18. Similarly, the CPU 6 manages generation of image data concerning a second color (magenta). The system ASIC 7 manages the memory 8 for the second color, and the video output controller 9 is a function block for outputting the concerned image data to the image generating section 18. Similarly, the CPU 10 manages generation of image data concerning a third color (yellow). The system ASIC 11 manages the memory 12 for the third color, and the video output controller 13 is a function block for outputting the image data to the image generating section 18. Similarly, the CPU 14 manages generation of image data for a fourth color (black). The system ASIC 15 manages the memory 16 for the fourth color, and the video output controller 17 is a function block for outputting the image data to the image generating section 18.

The image data of the first color (cyan) stored in the memory 4 is sent to the image generation section 18 via the video output controller 5. Moreover, the image data of the second color (magenta) stored in the memory 8 is sent to the image generating section 18 via the video output controller 9. The image data of the third color (yellow) stored in the memory 12 is sent to the image generating section 18 via the video output controller 13. Furthermore, the image data of the fourth color (black) stored in the memory 16 is sent to the image generating section 18 via the video output controller 17.

As described above, the color laser printer according to the embodiment of the present invention constituted by the separate CPUs provided for each of the colors, the ASICs under control of the CPUs, the memories, the video output controllers and the image generating section.

(2) Descriptions of an Operation

Figure 2:
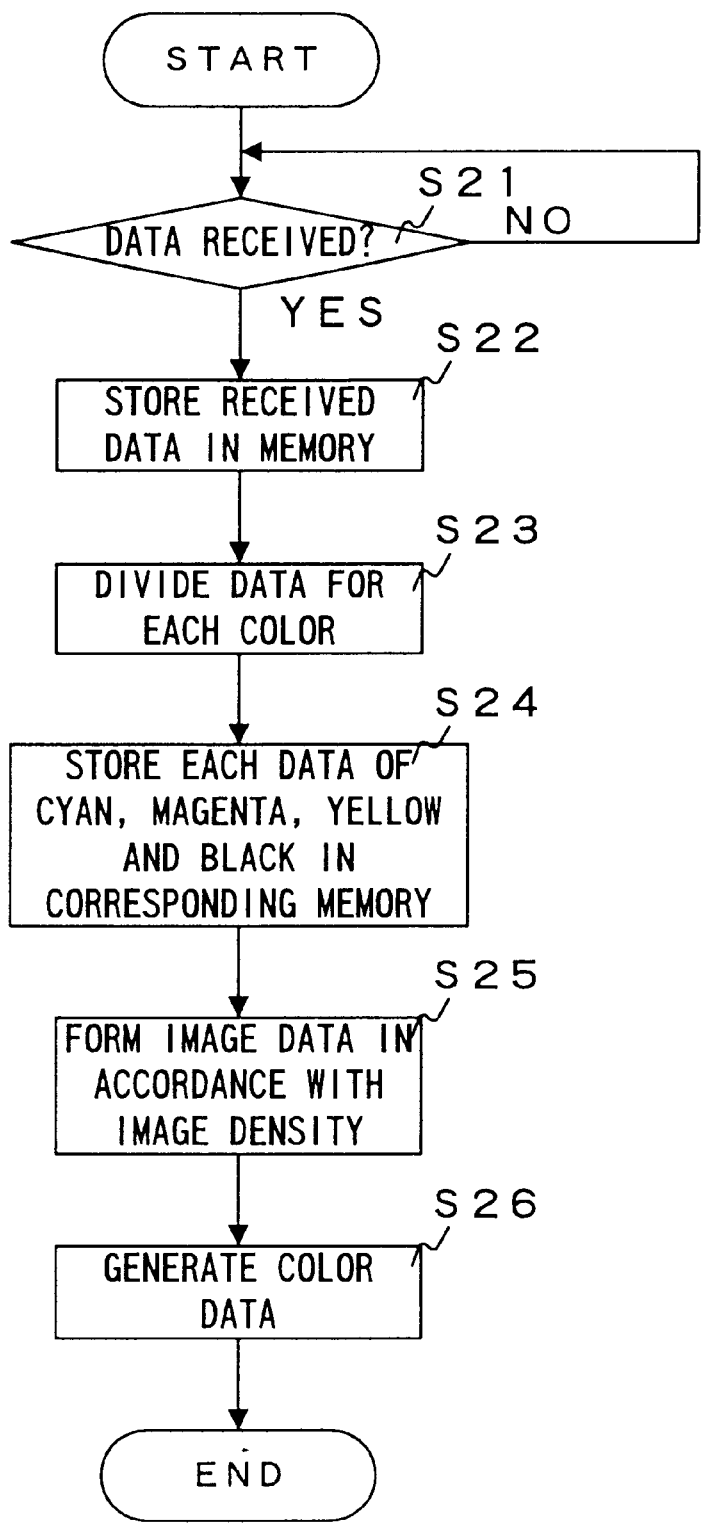
FIG. 2 is a flowchart showing image generation processing in the color laser printer according to the embodiment of the present invention.

Next, an operation of the color laser printer according to the embodiment of the present invention will be described with reference to FIGS. 1 and 2. FIG. 2 is a flowchart showing image generating processing of the color laser printer according to the embodiment of the present invention.

When data is received from the host PC via the host PC interface 19 and the I/O controller 3 (step S21), the data received from the host PC is stored in the memory 4 after passing through the I/O controller 3 and the system ASIC (step S22). This data is code data including all color information. The CPU 1 divides this data into data for each of the colors (cyan, magenta, yellow and black in this embodiment) (step S23).

Figure 3:
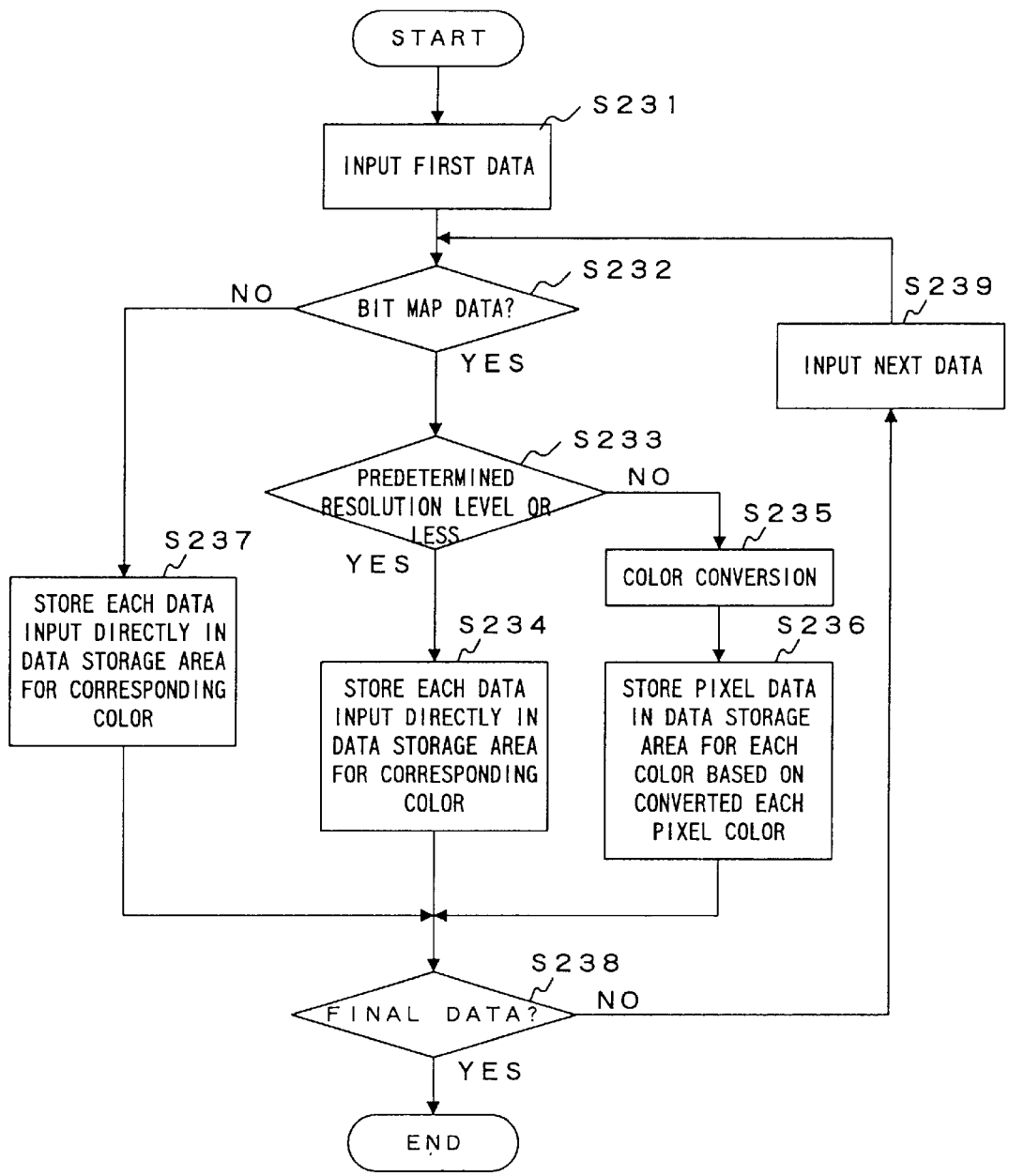
FIG. 3 is a flowchart showing processing for dividing data of FIG. 2 for each color in detail.

The detail of step S23 will be described with reference to FIG. 3.

First of all, the first data of the received data from the host PC is input to the CPU 1 (step S231). Next, the CPU 1 decides whether or not the data input is bit map data (step S232). If the data input is the bit map data, the CPU 1 decides whether or not the bit map data has a resolution of a predetermined level or less, which determines the necessity of a color conversion (step S233). With reference to the bit map data having a resolution higher than the predetermined level, it is possible to shorten a processing time of the bit map data by previously performing the color conversion to YMCK and transmitting the bit map data by a necessary quantity for each color than by performing the color conversion by means of each of the three CPUs after transmitting the bit map data to the three CPUs. On the contrary, with reference to the bit map data having the resolution of the predetermined level or less, it is possible to shorten a processing time of the bit map data by transmitting the bit map data to the other three CPUs and performing the color conversion by each CPU than by transmitting the bit map data by a necessary quantity for each color after performing the color conversion to YMCK. When it is decided in step S233 that the resolution of the bit map data is the predetermined level or less, each of the data input is directly stored in the data storage area for corresponding one of the color (step S234). When it is decided in step 233 that the resolution of the bit map data is higher than the predetermined level, the bit map data undergoes the color conversion to YMCK (step S235), and pixel data is stored in the data storage area for each color based on the color of each pixel which has been subjected to the color conversion (step S236). When it is decided in step 232 that the data input is not the bit map data, the data input is directly stored in the data storage area for each color (step S237). After the processings of steps S234, S236 and S237, it is decided whether the received data is final data (step S238). If the data received is not the final data, next data is input to the CPU 1 (step S239), and the procedure returns to step S232. When it is decided in step 238 that the received data is the final data, the processing of step S23 shown in FIG. 2 is completed.

Then, the data for the color "cyan is" stored in the memory 4 in the system again. On the other hand, the data for the color "magenta" passes through the system ASIC 2, and passes on the common bus 20. The data for the color magenta is sent to the second memory 8 via the second system ASIC 7. The data for the color yellow passes through the system ASIC 2, and passes on the common bus 20. The data for the color "yellow" is sent to the third memory 12 via the third system ASIC 11. Similarly, the data for the color "black" passes through the system ASIC 2, and passes on the common bus 20. The data for the color "black" is stored in the memory 16 via the system ASIC 15. In such manner, the code data divided for each color is stored in the memory (the memory 4, the memory 8, the memory 12 and the memory 16) assigned for each color (step S24).

Then, with respect to the code data for each color, image data in accordance with an image density of the laser engine (600 dpi×600 dpi in this embodiment) is generated (step S25). Each of the image data, by asynchronous signal from the image generation section, is sent to the image generating section 18 via the corresponding one of the video output controllers 5, 9, 13 and 17, and a beautiful color image is generated by a color addition and mixing operation by an electrophotography mechanism (step S26).

According to this embodiment of the present invention, the inexpensive four CPUs on the market are used for the corresponding four colors, thus enabling the generation of the high speed color image data. Thus, the present invention can provide the high speed color laser printer.

Furthermore, in the above-described embodiment, the example in which the image data from the host PC interface 19 is temporarily stored in the memory 4 was shown. If an access time of the memory 4 and the system ASIC 2 operate at a high speed in relation to the CPU1, the image data from the host PC interface 19 can be allocated to the systems ASICs 2, 7, 11 and 15 in real time.

Moreover, in the above-described embodiment of the present invention, the printing for the colors including cyan, magenta, yellow and black in the image generating section 18 was described. When a dye material is Red, Green and Blue, a drive circuit and a controller in accordance with each color of Red, Green and Blue can be provided.

As described above, according to the present invention, each of the image data for the specified colors is generated by the corresponding main control means (CPU) provided for the plurality of colors, and each of the image data for the specified colors is stored in corresponding one of the storage means by the plurality of storage control means (system ASIC) provided for the corresponding main control means. Each of the image data stored in the storage means is output as the video signal by the plurality of video output control means, and the image generation is performed based on the video signal by the plurality of image generating means provided for each of the video output control means. Accordingly, the present invention shows the following effects.

In the color laser printing, a very large quantity of data must be generally processed at a high speed. In the case of the color laser printing, a data processing capability quadruple to 32 times as that the case of the monochromatic laser printing is required for a CPU. However, it is difficult to obtain an inexpensive CPU which satisfies such performance. For this reason, in the present invention, by using the four inexpensive CPUs on the market for the corresponding four colors, it is possible to generate the high speed color image, and hence the high speed color laser printer can be provided.

Although the preferred embodiment of the present invention has been described in detail, it should be understood that various changes, substitutions and alternations can be made therein without departing from spirit and scope of the invention as defined by the appended claims.

What is claimed is:

1. A printing apparatus for forming a color image on a printing medium, comprising a plurality of main control means, each of which is provided for corresponding one of a plurality of colors for generating image data specified colors;

a plurality of storage means corresponding to the plurality of main control means, for storing the image data of the specified colors;

a plurality of storage control means corresponding to the plurality of storage means, for controlling writing/reading of the image data for the corresponding plurality of storage means;

a plurality of video output control means corresponding to the plurality of storage control means, for outputting the image data supplied from the corresponding storage control means as a video signal; and an image generating means corresponding video control means, for generating an image based on the video signal outputted from the plurality of video output control means.

2. The printing apparatus according to claim 1, wherein the plurality of colors are cyan, magenta, yellow and black; and each image generating means exposes a surface of a photosensitive drum with a laser beam, forms a latent image, and develops the latent image, thus transferring an image onto the printing medium.

3. The printing apparatus according to claim 1, wherein each main control means comprises a CPU constituted by a microprocessor; and each storage control means is comprises an IC for a special use.

4. The printing apparatus according to claim 1, wherein one of the main control means divides printing object data for each of the plurality of colors; and each main control means generates image data in accordance with an image density of each image generating means based on the divided data.

5. The printing apparatus according to claim 4, wherein the printing object data is transmitted from an upper unit;

one of the main control means controls the whole printing apparatus; and the storage control means corresponding to the one of the main control means controls a transfer of the printing object data received from the upper unit.

6. A method for forming a color image on a printing medium, comprising the steps of:

generating image data of a specified color by each of a plurality of main control means provided for a corresponding plurality of colors;

storing the image data of the specified color in each storage means by each of a plurality of storage control means corresponding to the plurality of main control means;

outputting the image data in each of said plurality of storage means by each of a plurality of video output control means corresponding to the plurality of storage control means; and generating an image based on a video signal by a plurality of image generating means provided for the corresponding plurality of video output control means.

* * * * *